United States Patent
Cook et al.

[11] Patent Number: 5,735,072
[45] Date of Patent: Apr. 7, 1998

[54] FISH HOOK CONSTRUCTION

[75] Inventors: Russel P. Cook, Wellesley; Robert Brackett, East Sandwich; Carl B. Malcolm, III, Natick, all of Mass.

[73] Assignee: Physh, Inc., Wellesley, Mass.

[21] Appl. No.: 538,749

[22] Filed: Oct. 3, 1995

[51] Int. Cl.⁶ .................................................. A01K 83/00
[52] U.S. Cl. .................................................. 43/43.16
[58] Field of Search .................. 43/43.16, 44.2, 43/44.8

[56] References Cited

U.S. PATENT DOCUMENTS

| | | | |
|---|---|---|---|
| 699,397 | 5/1902 | Lacey | 43/43.16 |
| 3,000,131 | 9/1961 | Stinson | 43/44.8 X |
| 4,570,373 | 2/1986 | Brief | 43/43.16 |
| 4,930,248 | 6/1990 | Owens | 43/43.16 |
| 4,987,696 | 1/1991 | Cook | 43/43.16 |
| 5,056,257 | 10/1991 | Cook | 43/43.16 |
| 5,199,209 | 4/1993 | Cook | 43/43.16 |
| 5,271,177 | 12/1993 | Cook | 43/43.16 |
| 5,386,661 | 2/1995 | Davis | 43/44.8 |

*Primary Examiner*—Joseph J. Hail, III
*Assistant Examiner*—Jay A. Stelacone
*Attorney, Agent, or Firm*—Paul J. Cook

[57] ABSTRACT

A fish hook construction is provided including a hook having a barb and a first shank. A second shank is attached to the first shank and is spaced apart from the first shank to permit bait to be positioned on the first shank. A wing is positioned on the second shank which directs movement of the construction when a force is applied to a line attached to the hook construction.

5 Claims, 3 Drawing Sheets ated to the second shank. When the wing or wings are attached directly to the shank, the shank length available to accommodate bait is reduced since it is difficult to push the bait along the shank past a wing.

FISH HOOK CONSTRUCTION

BACKGROUND OF THE INVENTION

This invention relates to a fish hook construction adapted to increase the probability of implanting the hook into a fish.

Prior to this invention, it has been proposed in U.S. Pat. No. 699,397 to provide a fish hook with a vane or a wing which extends in a direction from the hook shank directly opposite to the direction of extension of the hook. By utilizing such a wing or vane, when the line attached to the hook is pulled, the hook will move upwardly toward the direction of pull. This upward move is caused by the drag imposed by the wing or vane which functions as a fulcrum to provide the upward hook movement. If the hook is positioned so that the hook extends away from the fish, the sudden pulling and upward movement of the hook will cause the hook to move away from the fish thereby rendering the hook useless.

It has also been proposed in U.S. Pat. No. 4,987,696 to provide a fish hook construction which includes one or more wings rigidly secured to a shank of the construction. When the wing or wings are attached directly to the shank, the shank length available to accommodate bait is reduced since it is difficult to push the bait along the shank past a wing.

U.S. Pat. No. 5,056,257 also discloses a fish hook construction which includes one or more wings of a particular design. When the wings are attached directly to the shank, they also render it difficult to push the bait along the shank past the wings.

U.S. Pat. No. 5,199,209 discloses an attachment for a fish hook which has one or more wings. The attachment is directly secured to the shank so that the wings also render it difficult to thread bait along the shank past the wings.

U.S. Pat. No. 5,271,177 also discloses an attachment for a fish hook which has a wing. The wing is positioned on an attachment extension which extends below the hook elbow. The attachment prevents bait from being threaded past the hook elbow.

It would be desirable to provide a fish hook construction which improves the probability of implanting the hook barb into the haw or mouth tissue of a fish during use by an angler. It would also be desirable to provide such a fish hook construction which permits threading a bait along substantially the entire shank length of a hook construction. It would also be desirable to provide such a hook construction which is capable of being formed from one piece.

SUMMARY OF THE INVENTION

This invention provides a fish hook construction which comprises a hook having an elbow, a first shank, a barb and means for attaching a line to the construction. A second shank is attached to the first shank and at least one wing is attached to the second shank. The second shank is positioned away from the first shank to permit bait to be positioned along the length of the first shank and positioned between the two shanks. The wing is positioned relative to the hook at a position at the end of the barb or below the barb end away from the point of attachment of the line to the hook construction. The probability of the hook being implanted into the mouth of the fish is substantially increased when the line attached to the hook is pulled by the angler. In addition, when the hook is grasped by the angler by the first and second shanks, the first shank will not rotate thereby facilitating placement of bait or removal of a fish from the hook construction.

DESCRIPTION OF SPECIFIC EMBODIMENTS

Figure 1:
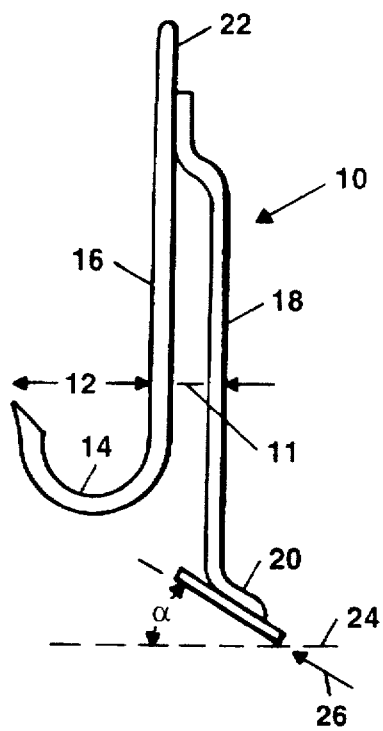
FIG. 1 is a side view of a hook construction of this invention.

In accordance with this invention, a hook construction is provided comprising a first shank, a hook elbow, a hook barb positioned on the hook, a second shank attached to the first shank, at least one wing attached to the second shank and means for attaching the hook to a flexible line. The wing is positioned at an angle between about 5 and 85 degrees, preferably about 30 and about 60 degrees from a direction perpendicular to the longitudinal axis of the first shank and pointed toward the means for attaching the hook to the line. The first and second shanks are spaced apart from each other a short distance to permit bait to be threaded along substantially the entire length of the first shank and so that the first and second shanks cooperate together to maintain the bait in place by compression force and friction. This distance is usually between about 1/32 and 1/2 inch and more usually between about 1/8 and 1/4 inch.

The second shank has one or more wings attached thereto. The wing or wings are positioned at a point or points along the second shank length and preferably at the same height as or below the hook barb and away from the point of attaching a line to the hook construction. The second shank can be attached to either the first shank or to the eye of the hook construction to which a fishing line is attached. The wing nearest the hook barb is positioned a distance between about 1/8 and about 1/2 inch, preferably between about 1/8 and 3/8 inch away from the hook barb, depending upon the size of the hook.

The hook construction can be formed from a unitary piece of material such as a polymeric composition or a malleable metal which can be bent in the shape of a hook, sharpened, and which can be compressed to form one or more wings. The unitary piece hook has the advantage of minimizing or eliminating means for attaching the wing and/or the second shank to the hook construction such as by welding or soldering. If desired, the metal can be hardened.

In use, bait, when employed, is threaded onto the hook barb, hook elbow and first shank. The bait is positioned between the first and second shanks so that the bait is more firmly held in place as compared to a hook not having a second shank. When the line attached to the hook is pulled by the angler, the Wing provides hydrodynamic lift so that the hook barb is lifted in a direction the same as the direction of the wing path. Since the wing is positioned at an angle from the axis defined above, the hook is lifted in a direction toward the side of the mouth of the fish. Thus, the fish hook of this invention provides greatly improved probability of being implanted into the mouth of the fish. In addition, the bait, when used, is retained in position of the hook along the first shaft length.

The second shank in the hook construction of FIGS. 1–8 extend in extend in a direction away from the first shank in a direction substantially opposite (180 degrees) the direction the hook elbow extends away from the shank.

Figure 5:
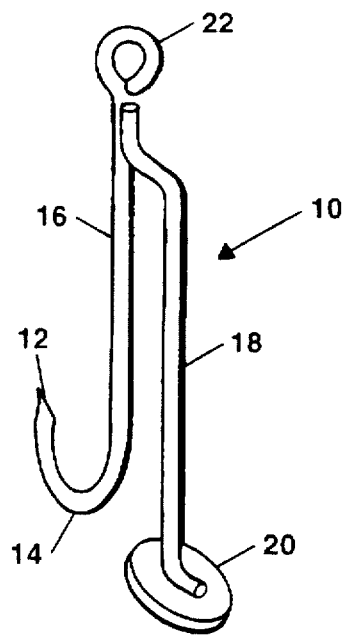
FIG. 5 is an angled view of the hook of FIG. 1.

Referring to FIGS. 1 and 5, the fish hook construction 10 includes a hook barb 12, a hook elbow 14, a first shank 16, a second shank 18 attached to the first shank 16, a wing 20 and an eye 22 for attaching a line to the construction 10. As shown, the wing 20 is positioned at substantially the same height as or below the barb 12 away from the eye 22. The wing 20 is positioned at an angle α between about 5 and about 85 degrees, preferably between about 30 and about 60 degrees to the line 24, which is perpendicular to the longitudinal axis of the straight first shank 16. The wing 20 is angled toward the eye 22 as shown by arrow 26. A plane defined by the wing is positioned substantially perpendicular to a plane defined by the hook elbow 14 and first shank 16. The space 11 between shanks 16 and 18 is usually between about 1/32 and 1/2 inch and preferably between about 1/16 and 1/4 inch. This spacing is typical of all of the fish hook constructions of this invention.

Figure 2:
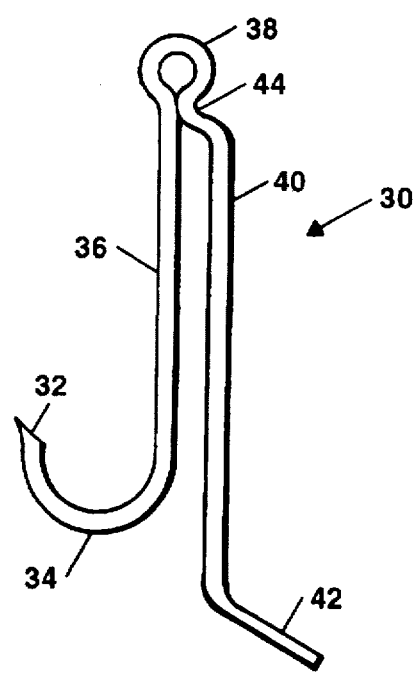
FIG. 2 is a side view of the hook of this invention formed of a one piece construction.
Figure 6:
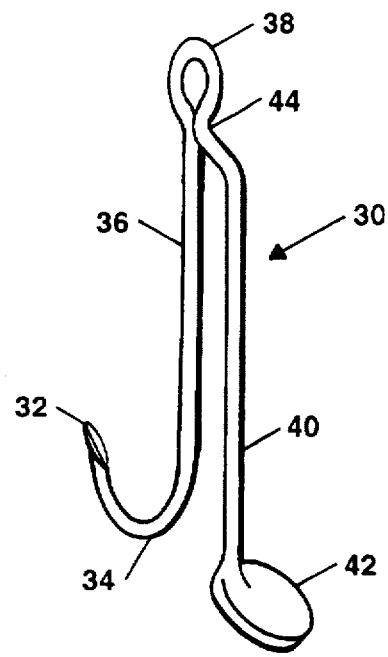
FIG. 6 is an angled view of the hook of FIG. 2.

Referring to FIGS. 2 and 6, a one piece fish hook construction 30 is shown which includes a hook barb 32, a hook elbow 34, a first shank 36, an eye 38, a second shank 40 and a wing 42. The hook construction 30 is formed by bending a metal cylinder in the shape shown, compressing one end, of the cylinder to form the wing 42 and abrading or otherwise forming the opposite end to form the hook barb 32. The first shank 36 and second shank 40 can be joined together at point 44, if desired, such as by welding, if desired.

Figure 3:
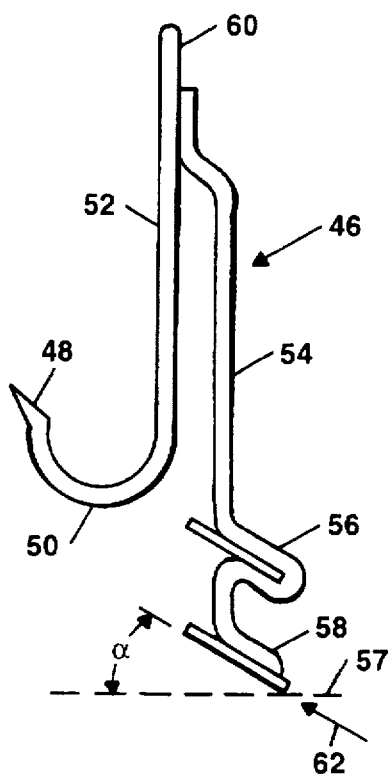
FIG. 3 is a side view of the hook of this invention with multiple wings.
Figure 7:
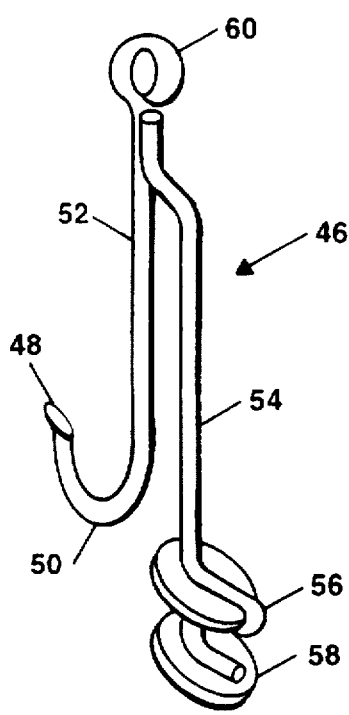
FIG. 7 is an angled view of the hook of FIG. 3.

Referring to FIGS. 3 and 7, the fish hook construction 46 includes a hook barb 48, a hook elbow 50, a first shank 52, a second shank 54 attached to the first shank 52, two wings 56 and 58 and an eye 60 for attaching a line to the construction 46. The wings 56 and 58 are positioned at substantially the same height as or below the barb 48 away from the eye 60. The wings 56 and 58 are positioned at an angle a between about 5 and about 85 degrees, preferably between about 30 and about 60 degrees to the line 57, which is perpendicular to the longitudinal axis of the straight first shank 52. The wings 56 and 58 are angled toward the eye 60 as shown by arrow 62.

Figure 4:
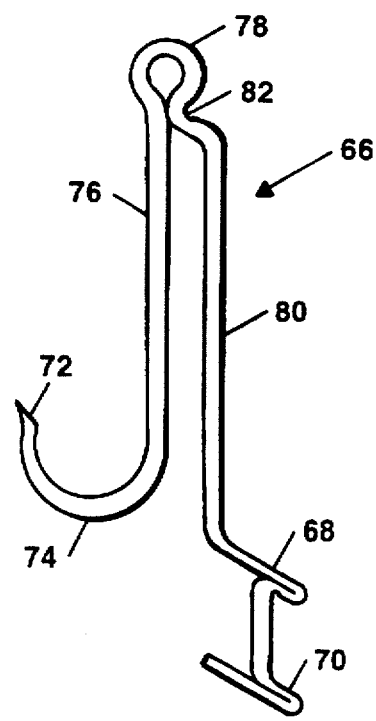
FIG. 4 is a side view of the hook of this invention having multiple wings and formed of a unitary construction.
Figure 8:
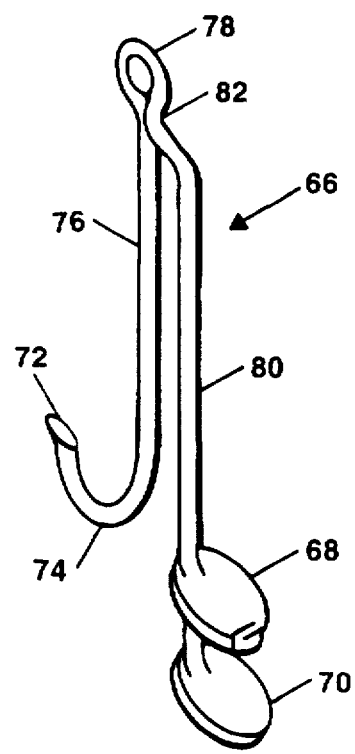
FIG. 8 is an angled view of the hook of FIG. 4.

Referring to FIGS. 4 and 8, a one piece fish hook construction 66 having two wings 68 and 70 is shown which includes a hook barb 72, a hook elbow 74, a first shank 76, an eye 78, and a second shank 80. The hook construction 66 is formed by bending a metal cylinder in the shape shown, compressing an intermediate portion to form wing 68, compressing one end of the cylinder to form the wing 70 and abrading or otherwise forming the opposite end to form the hook barb 72. The first shank 76 and second shank 80 can be joined together at point 82 such as by welding, if desired.

Figure 9:
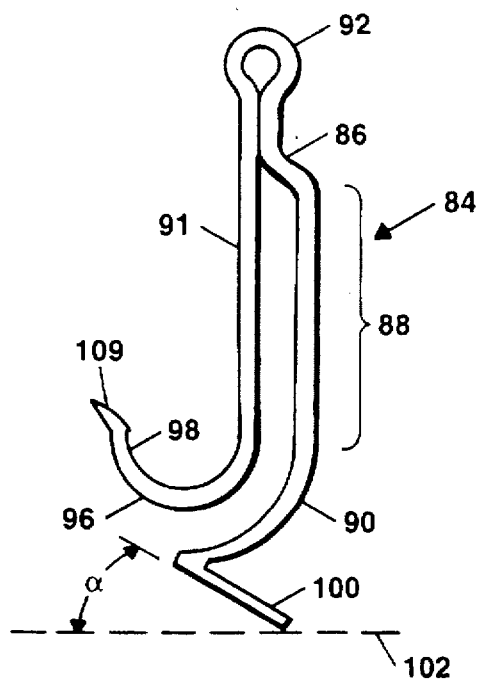
FIG. 9 is a side view of an alternative embodiment of this invention.

Referring to FIG. 9, an alternative fish hook construction 84 is shown wherein the second shank 86 has a straight portion 88 and a curved portion 90. The construction 84 includes an eye 92, a first shank 94, a hook elbow 96 and a hook barb 98. The wing 100 is positioned below the elbow 96 and is positioned at an angle, α to the line 102 perpendicular to straight shank 94 at an angle between about 5 and about 85 degrees toward the eye 92. More than one wing can be positioned on the second shank 86 at or below the end 104 of hook barb 98.

Figure 10:
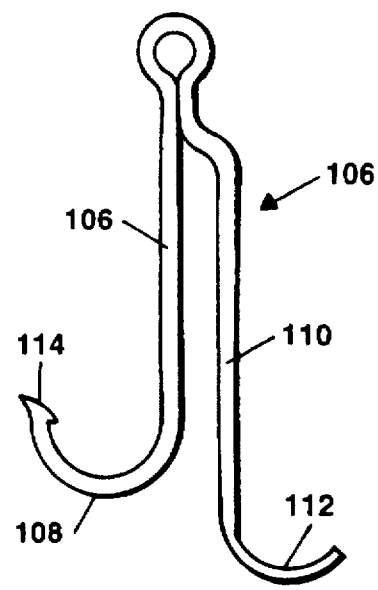
FIG. 10 is a side view of an alternative wing structure of this invention.

Referring to FIG. 10, the hook construction 105 includes a first shank 106, a hook elbow 108, a second shank 110 and a wing 112 curved in a direction toward the hook 114.

Figure 11:
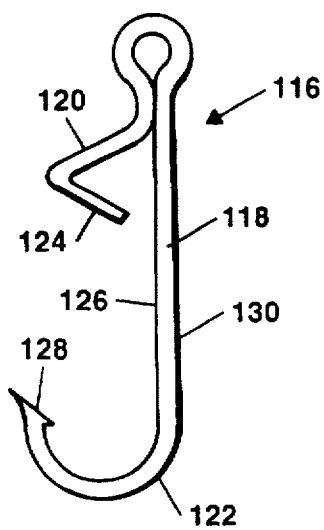
FIG. 11 is a side view of a wing of an alternative structure of this invention.

Referring to FIG. 11, the hook construction 116 includes a first shank 118, a second shank 120, a hook elbow 122 and a wing 124 attached to the second shank 120. The wing 124 is positioned adjacent the same surface 126 of the first shank 118 as the hook 128 rather than being positioned adjacent surface 130 of the first shank 118. The second shank 120 and wing 124 are positioned away from the first shank 118 in essentially the same direction that the fook elbow 122 extends away from the first shank 118.

Figure 12:
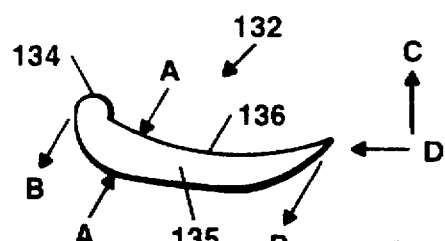
FIG. 12 is a cross sectional view of an alternative wing having a bulbous leasing edge.
Figure 13:
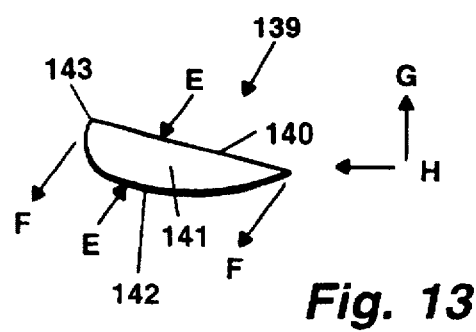
FIG. 13 is a cross sectional view of an alternative wing of this invention.

Referring to FIG. 12, the wing 132 has a bulbous leading edge 134 which extends above the convex top surface 136. The wing 132 also has a convex bottom surface 138. The widest portion of the wing 132, defined by lines A—A is positioned forward of the midpoint 135 of the wing length defined by lines B—B. When a force C is applied to a line attached to a hook construction including wing 132, the wing 132 causes the hook construction to move in the direction D rather than causing the hook to rotate Referring to FIG. 13, the wing 139 includes a planar top surface 140 and a convex bottom surface 142 and a leading edge 143. The widest portion of the wing 139 defined by lines E—E is positioned forward of the midpoint 141 along the length of the wing defined by lines F—F. When an upward force G is applied to a line attached to a hook construction, the wing causes the hook construction to move in the direction H rather than causing the hook construction to rotate. The planar wing constructions of FIGS. 1–11 also cause the hook constructions to move in essentially the same direction H in response to a pulling force G.

We claim:

1. A fish hook construction which comprises means for attaching a line to said construction, a first hook shank, a curved hook elbow attached to said first hook shank and extending from said first hook shank in a direction toward said means for attaching, a hook barb positioned at one end of said elbow, a second shank attached to said first shank or to said means for attaching a line, at least one wing having a surface which provides hydrodynamic lift and having a first portion rigidly secured to said second shank positioned between about 5 and about 85 degrees from a line perpendicular to a longitudinal axis of said first shank in a direction toward said means for attaching a line, a first plane of the at least one wing being substantially perpendicular to a second plane defined by the first shank and hook elbow, said first shank being spaced apart from said second shank a distance to permit bait to be positioned on said first shank.

2. The hook construction of claim 1 wherein said angle is between about 30 and abouat 60 degrees.

3. The hook construction of claim 1 wherein said second shank extends in a direction away from the first shank substantially opposite to the direction said elbow extends away from the first shank.

4. The hook construction of claim 2 wherein said second shank extends in a direction away from the first shank substantially opposite to the direction said elbow extends away from the first shank.

5. The fish hook of claim 1 having one wing.